United States Patent
Okutomi et al.

(10) Patent No.: US 6,211,972 B1
(45) Date of Patent: *Apr. 3, 2001

(54) ELECTRONIC MAIL CONVERTING APPARATUS FOR FACSIMILE

(75) Inventors: Hiroshi Okutomi, Tanashi; Toshihisa Sawada, Shiroi-machi; Kiyoshi Toyoda, Kunitachi, all of (JP)

(73) Assignee: Matsushita Graphic Communication Systems, Inc., Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/930,610
(22) PCT Filed: Mar. 6, 1997
(86) PCT No.: PCT/JP97/00695
 § 371 Date: Oct. 14, 1997
 § 102(e) Date: Oct. 14, 1997
(87) PCT Pub. No.: WO97/39568
 PCT Pub. Date: Oct. 23, 1997

(30) Foreign Application Priority Data

Apr. 18, 1996 (JP) .................................... 8-096520

(51) Int. Cl.[7] ............................. H04N 1/00; H04N 1/32; H04M 11/00
(52) U.S. Cl. .................... 358/402; 358/442; 379/100.13; 379/100.15
(58) Field of Search ................................ 358/402, 403, 358/442, 468; 379/93.15, 100.09, 100.13, 100.15

(56) References Cited

U.S. PATENT DOCUMENTS

| | | | |
|---|---|---|---|
| 4,837,798 | * | 6/1989 | Cohen et al. ..................... 379/88.11 |
| 5,091,790 | | 2/1992 | Silverberg ............................ 358/434 |
| 5,339,156 | * | 8/1994 | Ishii ..................................... 358/402 |

(List continued on next page.)

FOREIGN PATENT DOCUMENTS 0545552  6/1993  (EP) ............................... H04N/1/32

OTHER PUBLICATIONS

"Fax Finally Gets Through to LAN Users", Ortiz J. Data Communications, US, McGraw Hill, New York, vol. 21, No. 17, Nov. 21, 1992.
"An Online of Facsimile Data Conversion and Interface Equipment", Susumu Harashima et al., Japan Telecommunications Review, JP, Telecommunication Association, Tokyo, vol. 4, No. 23, Oct. 31, 1981, pp. 342–346.
An English Language Abstract of JP 6–164645.
An English Language Abstract of JP 5–268450.
An English Language Abstract of JP4–265040.
An English Language Abstract of JP4–280140.
An English Language Abstract of JP 4–154340.
An English Language Abstract of JP 55–34520.

*Primary Examiner*—Amelia Au
*Assistant Examiner*—Mehrdad Dastouri
(74) *Attorney, Agent, or Firm*—Greenblum & Bernstein, P.L.C.

(57) ABSTRACT

An electronic mail converting apparatus for facsimile that includes connections connecting to a facsimile, a public network, and a LAN. The connections may be internally changed according to the type of data or an instruction received. A converting device exists for converting data to e-mail data or vice versa, as required, wherein the converted data is transmitted to an instructed designation.

26 Claims, 10 Drawing Sheets

U.S. PATENT DOCUMENTS

| | | | | |
|---|---|---|---|---|
| 5,406,557 | * | 4/1995 | Baudoin | 379/88.17 |
| 5,465,162 | * | 11/1995 | Nishii et al. | 358/442 |
| 5,479,411 | * | 12/1995 | Klein | 358/402 |
| 5,530,740 | * | 6/1996 | Irribarren et al. | 379/88.17 |
| 5,557,659 | * | 9/1996 | Hyde-Thomson | 379/88.13 |
| 5,577,108 | * | 11/1996 | Mankovitz | 358/402 |
| 5,608,786 | * | 3/1997 | Gordon | 358/402 |
| 5,613,012 | * | 3/1997 | Hoffman et al. | 382/115 |
| 5,621,727 | * | 4/1997 | Vaudreuil | 370/401 |
| 5,647,002 | * | 7/1997 | Brunson | 379/88.18 |
| 5,649,182 | * | 7/1997 | Reitz | 707/7 |
| 5,675,507 | * | 10/1997 | Bobo, II | 379/93.24 |
| 5,721,908 | * | 2/1998 | Lagarde et al. | 707/1 |
| 5,734,480 | * | 3/1998 | Kawamura et al. | 358/296 |
| 5,767,985 | * | 6/1998 | Yamamoto et al. | 358/402 |
| 5,781,901 | * | 6/1998 | Kuzma | 358/402 |
| 5,793,497 | * | 8/1998 | Funk | 358/402 |
| 5,801,839 | * | 9/1998 | Ochiai | 358/404 |
| 5,881,233 | | 3/1999 | Toyoda et al. | 709/233 |
| 5,982,856 | * | 11/1999 | Cohen et al. | 379/88.06 |

* cited by examiner

| DESTIATION TELEPHONE NUMBER | DESTINATION E-MAIL ADDRESS |
|---|---|
| #1 | todd@abc. com |
| #2 | panafax@mgos. mei. co. jp |
| ⋮ | ⋮ |
| #999 | aaa@aaaaaaaa |

| NUMBER | E-MAIL ADDRESS | PRIVATE KEY |
|---|---|---|
| 001 | a10@mei.co.jp | 10 |
| 890 | a20@mei.co.jp | 20 |
| ⋮ | ⋮ | ⋮ |
| 999 | a99@mei.co.jp | 99 |

| NUMBER | E-MAIL ADDRESS | PUBLIC KEY | SECRET KEY |
|---|---|---|---|
| 000 | abc@USA.com | 8000 | 9000 |
| 123 | aaa@USA.com | 8123 | 9123 |
| ⋮ | ⋮ | ⋮ | ⋮ |
| 888 | XXX@USA.com | 8888 | 9888 |

ELECTRONIC MAIL CONVERTING APPARATUS FOR FACSIMILE

TECHNICAL FIELD

The present invention relates to an electronic mail (e-mail) converting apparatus enabling facsimile data to be transmitted to an e-mail address.

BACKGROUND ART

When a facsimile document is transmitted as an e-mail, it is necessary to have a large scale system, and a special data processing terminal.

Such conventional facsimile communication system includes a one disclosed in Unexamined Published Japanese Patent Application No. 6-164645. FIG. 1 shows its schematic block diagram. In FIG. 1, a facsimile 100 is connected to a host computer 200 to transmit and receive facsimile data over a public network 300. The facsimile 100 and the host computer 200 constitute a facsimile communication system 400. The facsimile communication system 400 connects to a local area network 500 connected to a personal computer, a workstation, a printer server, a file server, and the like.

In the conventional facsimile communication system thus arranged, an operator first places a document to be transmitted on a predetermined position of the facsimile 100, and enters a mail broadcast command, a mail address, and a broadcast address through an operation panel of the facsimile 100. This causes the facsimile 100 to broadcast input data of the transmit document to the instructed broadcast address, and to direct the host computer 200 to transmit an e-mail the instructed e-mail address. The host computer 200 transmits the transmit document data as an e-mail to the instructed e-mail address according to the instruction from the facsimile 100.

However, the above facsimile communication system is necessary to arrange a special computer interface between the facsimile and the host computer, an data-processing terminal. In addition, there is a problem that, when an e-mail address is entered, it must be entered through a specific data-processing terminal. Moreover, when facsimile data is converted into an e-mail format, it is necessary to use a specific host computer or data-processing terminal. Furthermore, there are problems in selection of a sender, saving of receiving paper, and privacy protection of the transmit document. Accordingly, it is difficult at present to transmit a facsimile document as an e-mail by utilizing the existing facsimile.

DISCLOSURE OF THE INVENTION

The present invention is made in view of the above problems, and intended to provide an electronic mail converting apparatus for facsimile which can be switched between facsimile transmission of a facsimile document and e-mail transmission of a facsimile document to an e-mail address, by using an existing facsimile.

The present invention provides an electronic mail converting apparatus for facsimile comprising connections connecting to a facsimile, a public network, and a LAN, the connections being internally changed over according to the type of data or an instruction, and converting section means for converting data from facsimile data to e-mail data or vice versa, as required, wherein the converted data is transmitted to an instructed destination.

According to the configuration of the present invention, it is possible to easily change over between facsimile transmission of a facsimile document and e-mail transmission of a facsimile document by using an existing facsimile, or without using a specific data-processing terminal or computer interface. In addition, according to this configuration, it is possible to convert stored facsimile data into an e-mail format, and to convert a telephone number into an e-mail address, whereby transmitting the data converted into the e-mail format to the address of e-mail.

BEST MODE FOR CARRYING OUT THE INVENTION

Figure 1:
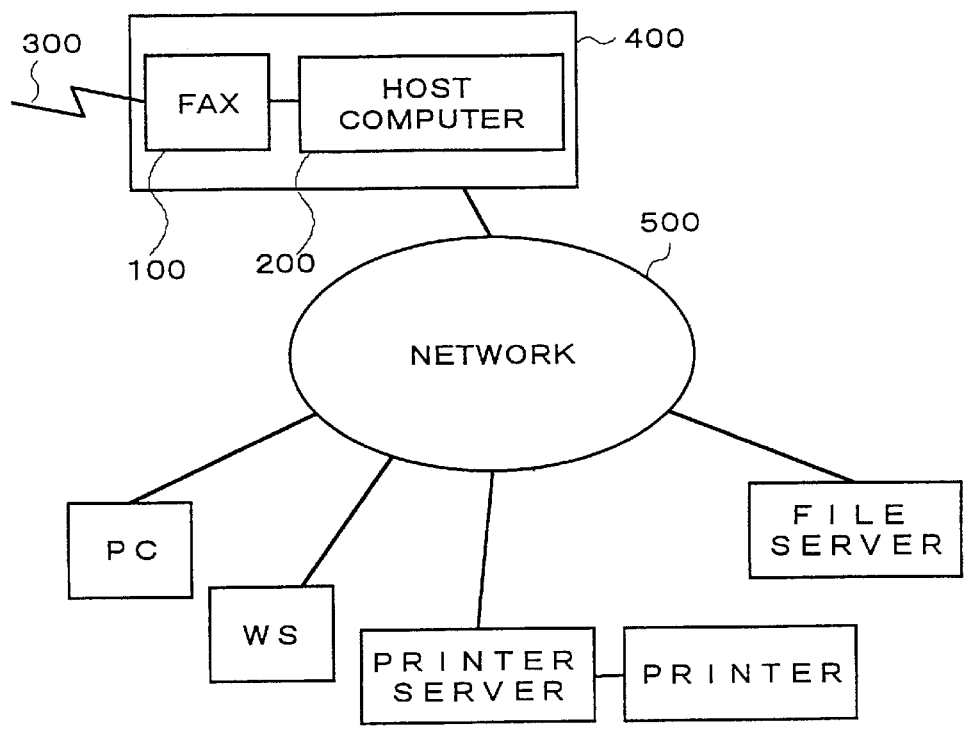
FIG. 1 is a schematic diagram showing a conventional apparatus system for transmitting a facsimile document as an e-mail.
Figure 2:
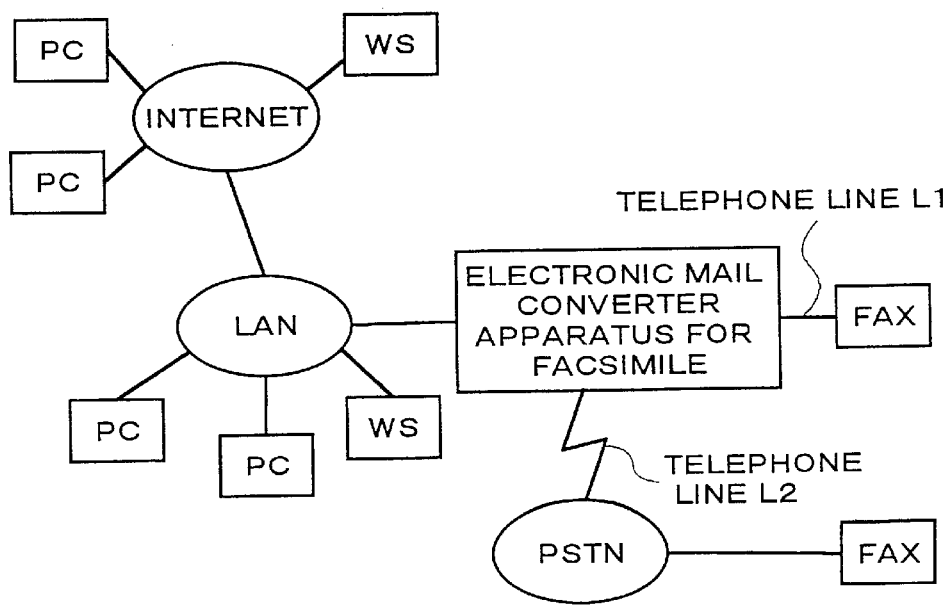
FIG. 2 is a schematic diagram showing a configuration of an electronic mail converting apparatus for facsimile of the present invention.

Now, detailed description is given on an embodiment of an electronic mail converting apparatus for facsimile of the present invention by referring to the drawings. FIG. 2 shows environment where the electronic mail converting apparatus for facsimile of the present invention operates. The electronic mail converting apparatus for facsimile of the present invention provides an interface with a telephone line and an interface with a LAN. The LAN interface assumes environment where an e-mail can be utilized. In addition, protocol of the LAN is to be Ethernet, but any other protocol may be used.

Figure 3:
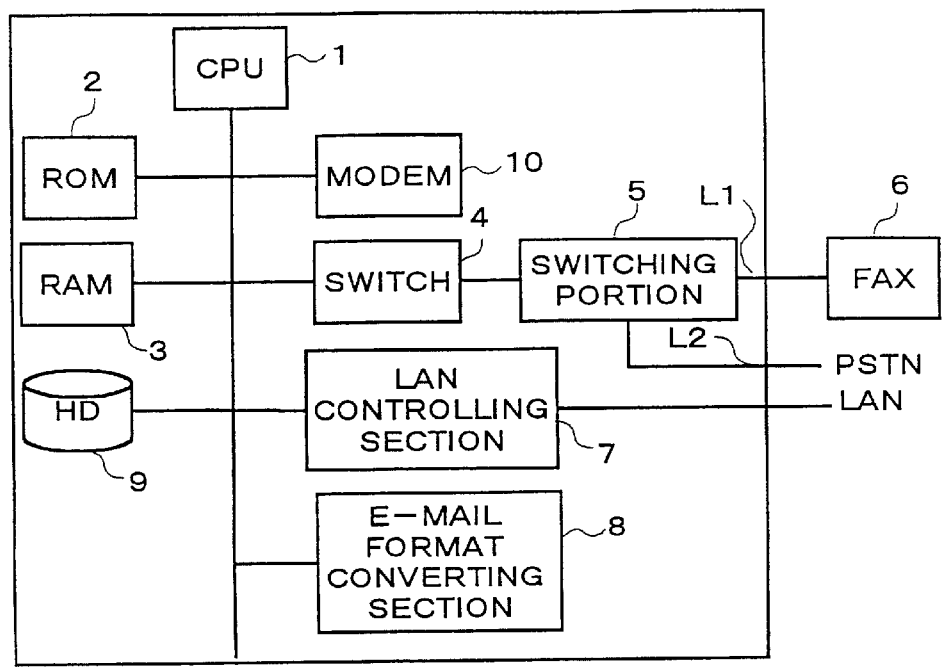
FIG. 3 is a basic block diagram of the electronic mail converting apparatus for facsimile shown in FIG. 2.

FIG. 3 is a schematic diagram showing the basic configuration of the apparatus according to the present invention. A CPU 1 is control means for controlling the entire apparatus, and performs predetermined control operations under various programs stored in a ROM 2. In addition, a RAM 3 is used as a memory for program data.

A switch 4 has a function for switching between a telephone line L1 and a telephone line L2. A switching portion 5 enables it to switch the telephone line L1 to a facsimile apparatus 6 and the telephone line L2. In addition, the switch 4 has a function for switching between the telephone line L1 or L2, and an internal LAN.

A LAN controlling section 7 transmits and receives an e-mail through the LAN. An e-mail format converting section 8 converts facsimile data received over the telephone line L1 into an e-mail format. Accordingly, it is arranged that the facsimile data received over the telephone line L1 is converted into a predetermined format by the e-mail format converting section 8, and the converted data is transmitted to the LAN by the LAN controlling section 7.

A hard disk (HD) 9 is an auxiliary storage for storing the facsimile data and e-mails. The HD 9 is also used for storing a correspondence table of e-mail addresses and telephone numbers. In addition, a modem 10 is a device for modulating and demodulating the data transmitted and received between the telephone line L1 or L2, and the LAN.

Figure 4:
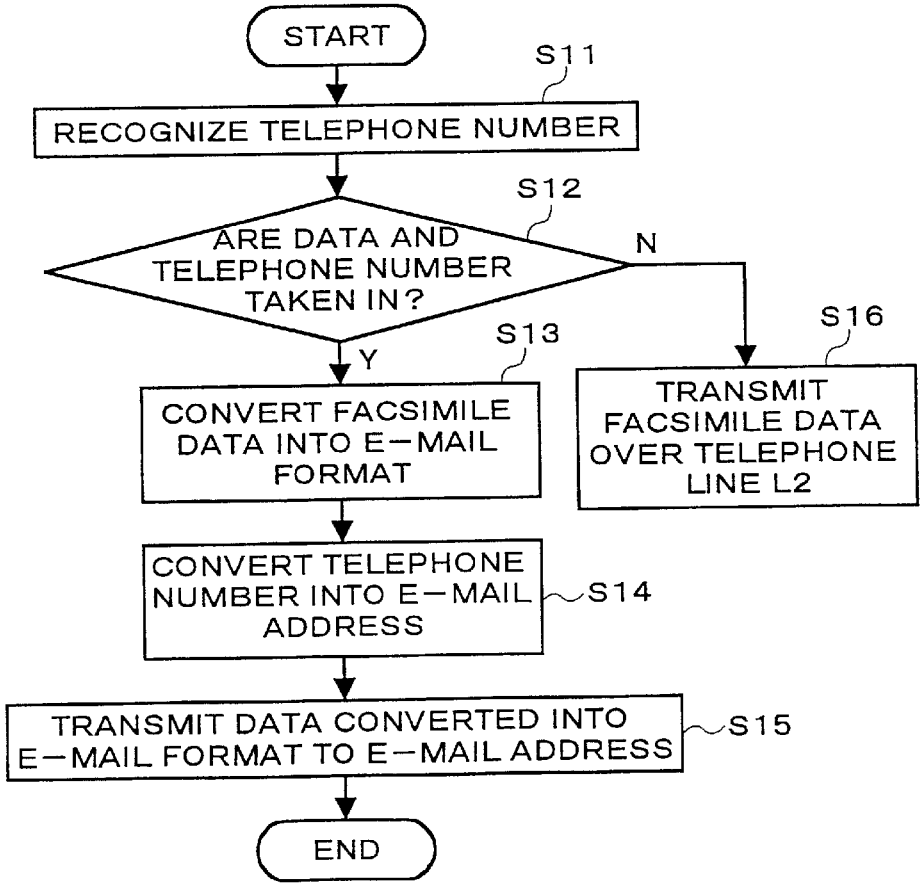
FIG. 4 is a flowchart when facsimile data is transmitted to an e-mail address.

FIG. 4 is a flowchart when the facsimile data is transmitted to an e-mail address. First, an operator places a transmit document on a predetermined position of the facsimile apparatus 6, and enters a telephone number through an operation panel of the facsimile apparatus 6. Then, the data is received by the converting apparatus over the telephone line L1.

When data on the destination telephone number is transmitted to the converting apparatus over the telephone line L1, the switch 4 recognizes the telephone number (S 11), and determines whether the data of telephone number and subsequent facsimile data are stored in the converting apparatus, or transmitted over the telephone line L2 (S 12). Then, the determination causes the switch 4 to change over the state through the switching portion 5 between sending the data to the telephone lines L1 and L2, and sending data to the LAN.

When the switch 4 determines to store the facsimile data in the converting apparatus, the e-mail format converting section 8 converts the facsimile data into the e-mail format (S 13). Then, the e-mail format converting section 8 converts the telephone number into an e-mail address according to the correspondence table of the telephone numbers and e-mail addresses previously stored in the HD 9 (S 14). Thereafter, the LAN controlling section 7 transmits the data converted into the e-mail format to the converted e-mail address (S 15). In the transmission, the modem 10 modulates the data.

Here, the e-mail format is the facsimile data converted into the TIFF format (format for managing an image with a personal computer), and appended with an MIME header (format for transmitting and receiving data other than text in an e-mail).

On the other hand, when the switch 4 determines not to store the facsimile data in the converting apparatus, it changes over the switching portion 5 to transmit the facsimile data over the telephone line L2 (S 16).

As described above, according to the converting apparatus, it is possible to perform communication with the LAN only through connection with the facsimile, so that e-mail communication can be attained by utilizing the LAN. That is, without specially providing a computer interface between the facsimile and an information terminal, it is possible by utilizing an existing facsimile apparatus to store the facsimile data received from the locally attached telephone line L1, to transmit it over the telephone line L2 which is PSTN (public switched telephone network), or to transmit it to an e-mail address attached to the LAN or Internet.

Figures 5, 6:
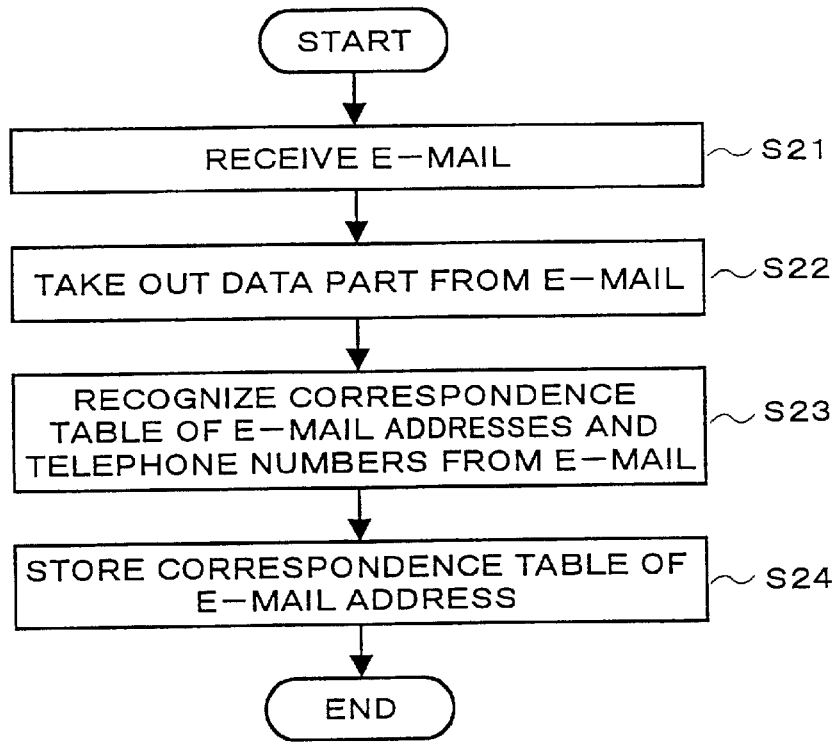
FIG. 5 is a flowchart when a correspondence table of telephone numbers and e-mail addresses is recognized from data and stored.
FIG. 6 is a correspondence table of telephone numbers and e-mail addresses.

The correspondence table of e-mail addresses and destination telephone numbers is stored in the HD 9 as shown in FIG. 5. That is, the LAN controlling section 7 receives an e-mail containing the data of the correspondence table of e-mail addresses and telephone numbers shown in FIG. 6 through the LAN (S 21), and takes out the data part from the e-mail (S 22). Then, the LAN controlling section 7 recognizes the data of correspondence table from the data part of the e-mail (S 23), and stores the data of correspondence table in the HD 9 (S 24).

Storage of the correspondence table of telephone numbers and e-mail addresses enables it to transmit the facsimile data to an e-mail address according to the correspondence table, or to transmit the received e-mail data to the facsimile.

Figure 7:
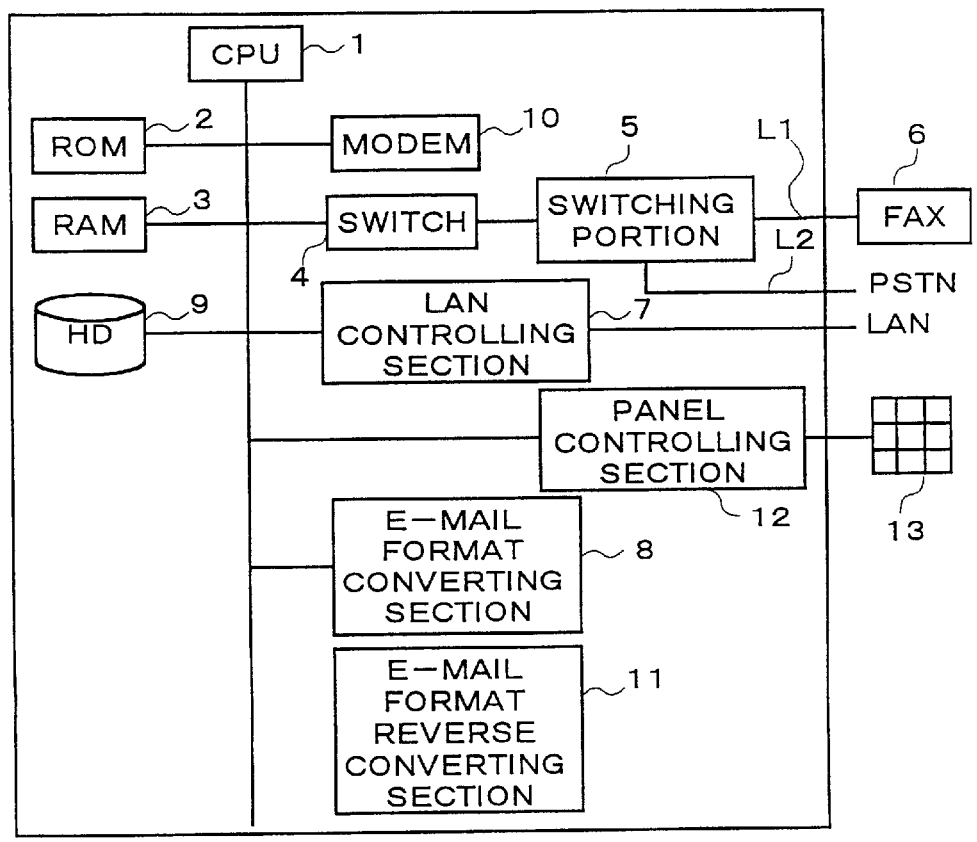
FIG. 7 is a block diagram of a device for receiving an e-mail, converting e-mail data into facsimile data, and transmitting it over a telephone line.

FIG. 7 is a schematic block diagram of a converting apparatus that receives an e-mail, reversely converts the e-mail data into facsimile data, and transmits it over the telephone line L1 or L2. Here, in FIG. 7, parts same as those in FIG. 3 are identified by the same reference numerals, and description on them is omitted.

In FIG. 7, an e-mail format reverse converting section 11 converts data in the e-mail format into facsimile data. Accordingly, it is arranged that the e-mail format reverse converting section 11 converts the data in the e-mail format into the facsimile data, and it is transmitted over the telephone line L1 or L2 through changing-over of the switching portion 5 in the switch 4. A panel controlling section 12 serves to send signals from a ten-key 13 with which the operator performs the input operation to the CPU 1.

Figure 8:
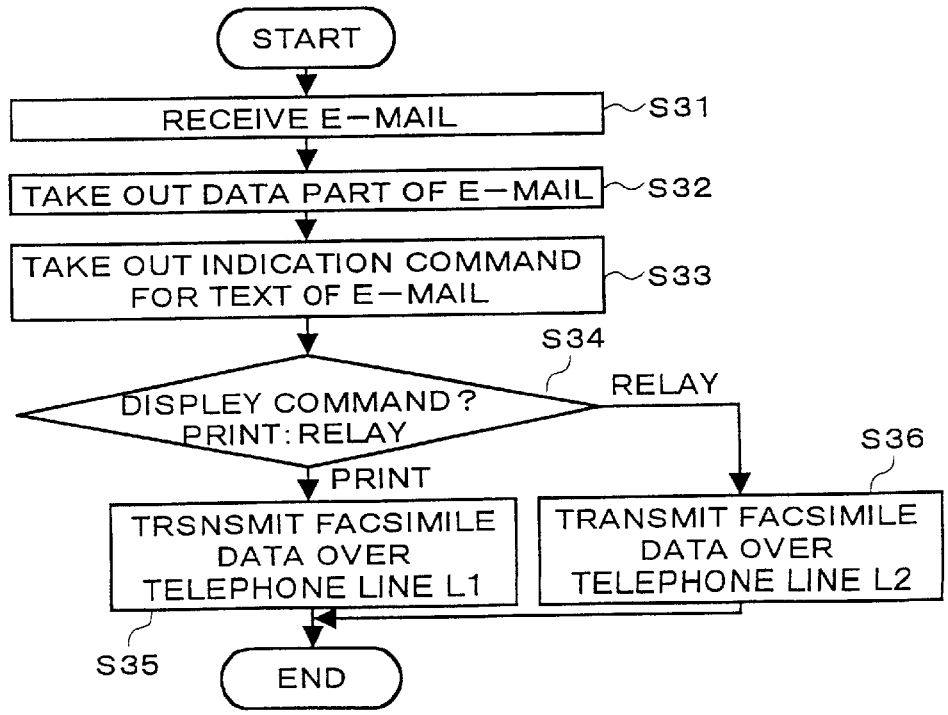
FIG. 8 is a flowchart when e-mail data is converted into and transmitted as facsimile data.

FIG. 8 is a flowchart when the converting apparatus shown in FIG. 7 receives an e-mail, converts it from the e-mail data to the facsimile data, and transmits the converted facsimile data. First, when the operator transmits an e-mail, the LAN controlling section 7 receives it through the LAN (S 31), and takes out the data part of the e-mail (S 32). Then, the LAN controlling section 7 takes out an indication command for the text in the data part of the e-mail (S 33).

Then, the LAN controlling section 7 determines whether the indication command for the text of the e-mail is PRINT or RELAY (S 34). In this case, if the indication command for the text of the e-mail is PRINT, it is transmitted over the telephone line L1. If the indication command is RELAY, it is transmitted over the telephone line L2. When transmission is performed over the telephone line L1 or L2, the e-mail format reverse converting section 11 converts the data in the e-mail format into the facsimile data. Then, the thus converted facsimile data is transmitted over the telephone line L1 or L2 according to the indication command (S 35, S 36).

With such arrangement, the e-mail data can be transmitted to the existing facsimile by converting the received e-mail data into the facsimile data without need for a special computer interface between an information terminal and a specific facsimile apparatus. In addition, it becomes possible to utilize the existing facsimile as a network printer by transmitting the content of the e-mail to the existing facsimile connected to the telephone line L1.

Figure 9:
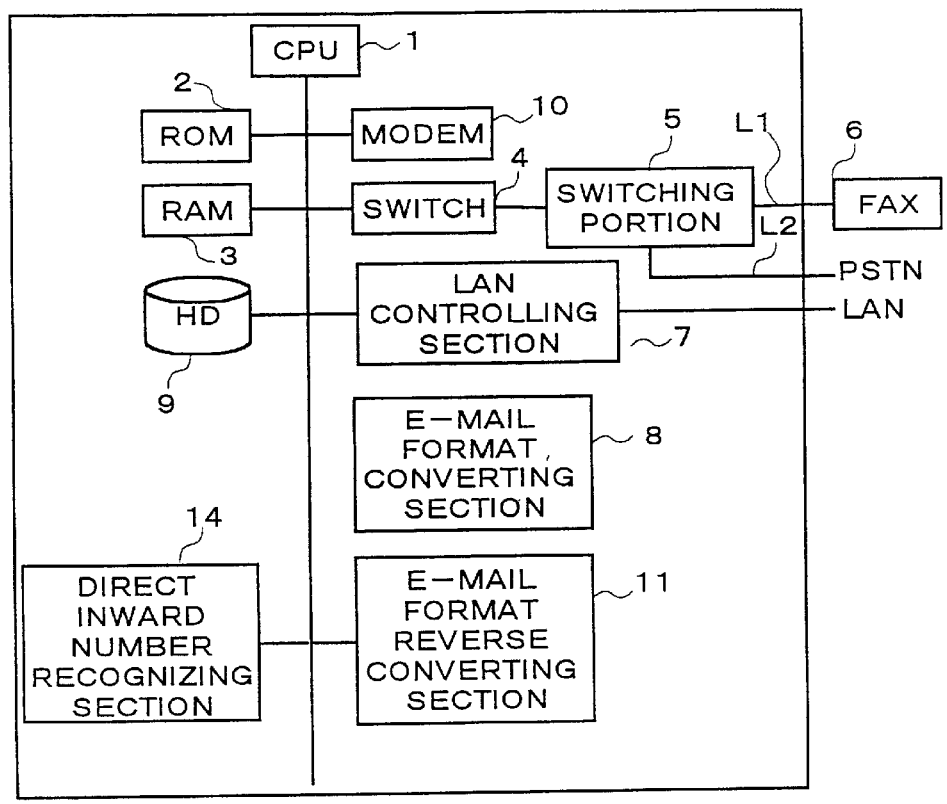
FIG. 9 is a block diagram of a device for converting e-mail data into facsimile data, and transmitting it over a telephone line.

FIG. 9 is a schematic block diagram of a converting apparatus that, similar to the converting apparatus of FIG. 7, receives an e-mail, reversely converts e-mail data into facsimile data, and transmits it over the telephone line L1 or L2. Here, in FIG. 9, parts same as those in FIG. 3 are identified by the same reference numerals, and description on them is omitted.

In FIG. 9, an direct inward number recognizing section 14 recognizes a direct inward number transmitted over the public network through the telephone line L2. Accordingly, the switch 4 recognizes the sent direct inward number received from the public network, and changes over the switching portion 5 so that It is received in the converting apparatus through the telephone line L2. Then, the direct inward number recognizing section 14 recognizes the direct inward number.

Figure 10:
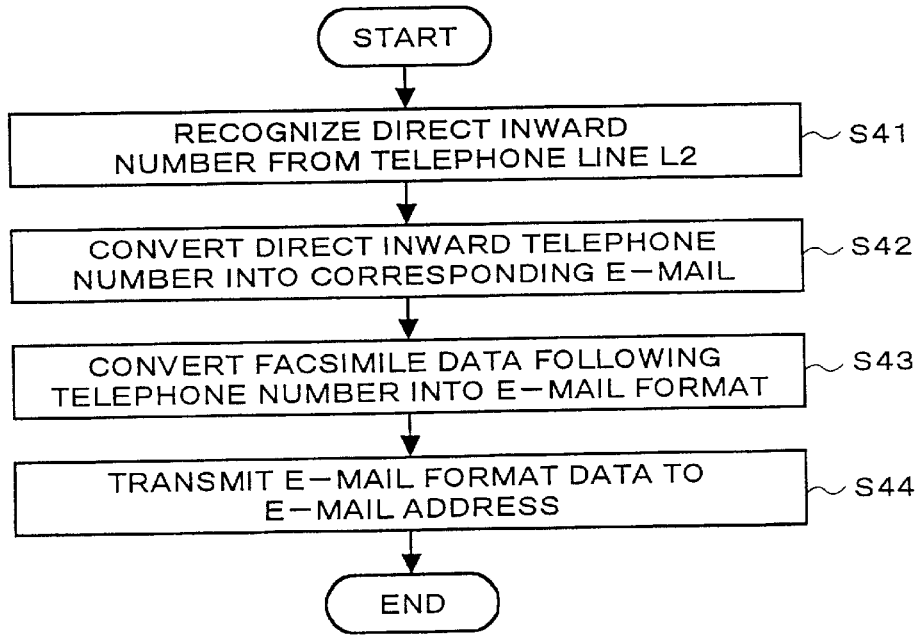
FIG. 10 is a flowchart when a direct inward telephone number transmitted over a telephone line is recognized, and facsimile data is transmitted to an e-mail address corresponding to the direct inward telephone number.

FIG. 10 is a flowchart when the converting apparatus shown in FIG. 9 recognizes the sent direct inward telephone number transmitted over the telephone line L2, and transmits facsimile data to an e-mail address corresponding to the direct inward number. First, when the operator transmits the direct inward number and the facsimile data, the switch 4 changes over the switching portion 5 to the telephone line L2, whereby the converting apparatus receives the direct inward number and the facsimile data over the public network through the telephone line L2. In this case, the direct inward number recognizing section 14 recognizes the received direct inward number (S 41).

Then, the e-mail format converting section 8 converts the direct inward number into the e-mail address according to the correspondence table of direct inward numbers and e-mail addresses previously stored in the HD 9 (S 42). Subsequently, the e-mail format converting section 8 converts facsimile data following the direct inward number into the e-mail format (S 43). Thereafter, the LAN controlling section 7 transmits the facsimile data converted into the e-mail format to the converted e-mail address (S 44). Here, similar to the above, the e-mail format is the facsimile data converted into the TIFF format, and appended with an MIME header.

As described, according to the converting apparatus, it is possible to recognize a direct inward telephone number transmitted over the telephone line L2 through the public network, to convert the facsimile data into the e-mail format, and to transmit the converted facsimile data to an e-mail address corresponding to the direct inward number.

Now, description is given on a case where an e-mail is output to the facsimile apparatus when an e-mail address of a sender is recognized, and collated with an e-mail address in the e-mail address book.

Figure 11:
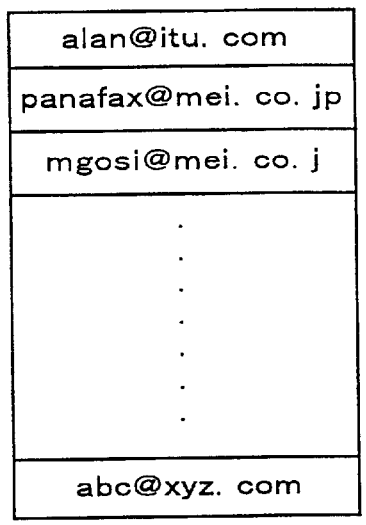
FIG. 11 is a format of an e-mail address book.

When the converting apparatus receives an e-mail containing an e-mail address list shown in FIG. 11, for example, when it recognizes that the header information (From) of the e-mail is master, and its Subject is !!$list, the text of the e-mail or the e-mail address list is stored in the RAM 3 and the HD 9 as an e-mail address book. The e-mail is output to the facsimile apparatus by using the e-mail address book and the above-mentioned correspondence table.

Here, the e-mail address book is created by defining and obtaining character strings such as "master" or "!!$list" which is never used as an ordinary e-mail address. Thus, it is possible to transmit the e-mail as the facsimile data by using the header information of e-mail, without inherent processing.

Figure 12:
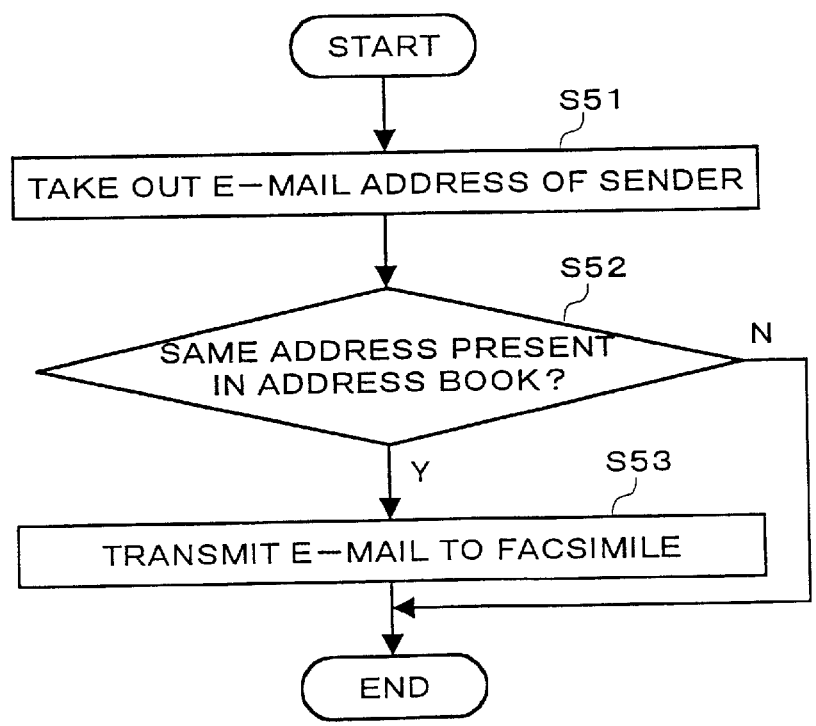
FIG. 12 is a flowchart when an e-mail is output through an address listed in the e-mail address book.

Now, the above operation is described by referring to the flowchart shown in FIG. 12, and FIG. 7. When the LAN controlling section 7 receives an e-mail while the HD 9 contains the e-mail address book, it takes out the e-mail address of the sender from the header information (From) of the e-mail (S 51). Then, the taken out e-mail address is collated with the e-mail address book (S 52). If the same address is found in the e-mail address book, the e-mail format reverse converting section 11 converts the text of the e-mail into facsimile data, and transmits it to a telephone number corresponding to the e-mail address according to the correspondence table stored in the HD 9 (S 53). In this case, the switch 4 appropriately changes over the switching portion 5 depending on the destination telephone number to select the telephone line L1 or L2.

According to such arrangement, since only senders from whom e-mails are desired to be received can be previously registered, it is possible to prevent reception of a mischief facsimile message or a facsimile message that is indiscriminately transmitted.

Figure 13:
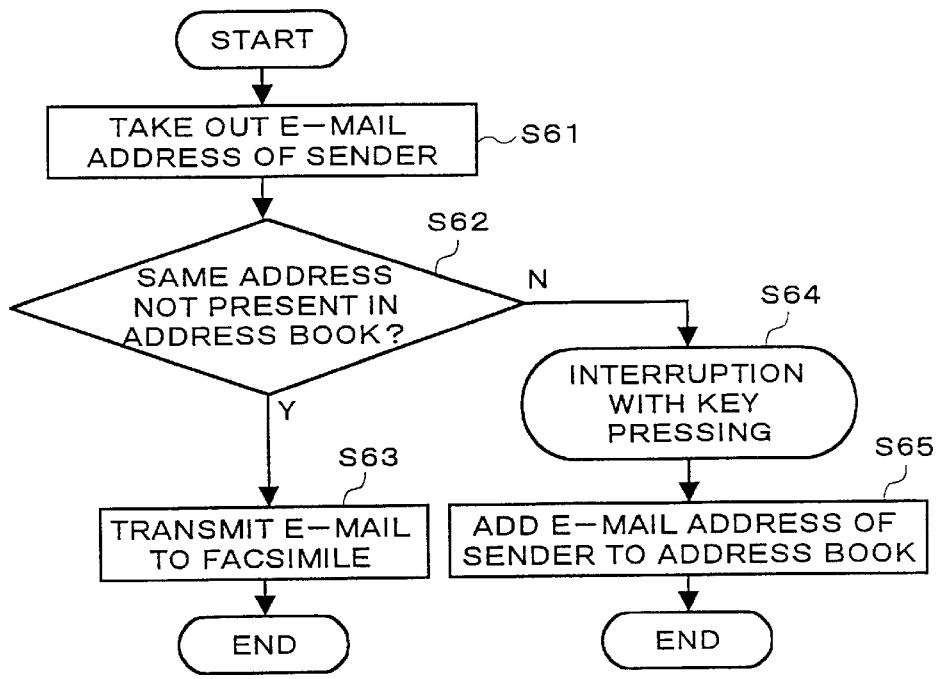
FIG. 13 is a flowchart when an e-mail is not output through an address listed in the e-mail address book.

Now, a case is described where an e-mail is not received from an address listed in an e-mail address book. Again, the description is given by referring to FIG. 7. FIG. 13 is a flowchart in this case. First, when the LAN controlling section 7 receives an e-mail, it takes out the e-mail address of the sender from the header information (From) of the e-mail (S 61). Then, the taken out e-mail address is collated with the e-mail address book (S 62). If the same address is not found in the e-mail address book, the e-mail format reverse converting section 11 converts the text of the e-mail into facsimile data, and transmits it to a telephone number corresponding to the e-mail address according to the correspondence table stored in the HD 9 (S 63). In this case, the switch 4 appropriately changes over the switching portion 5 depending on the destination telephone number to select the telephone line L1 or L2.

In this case, an e-mail address is stored in the HD 9, and, when the ten-key 13 is pressed (S 64), added to the e-mail address book, which is then used as a new address book (S 65).

According to such arrangement, since it is possible to previously register senders from whom e-mails are not desired to be received, it is possible to prevent a mischief facsimile message from specific senders. Even if a mischief facsimile message is received, such sender can be rapidly registered.

Figure 14:
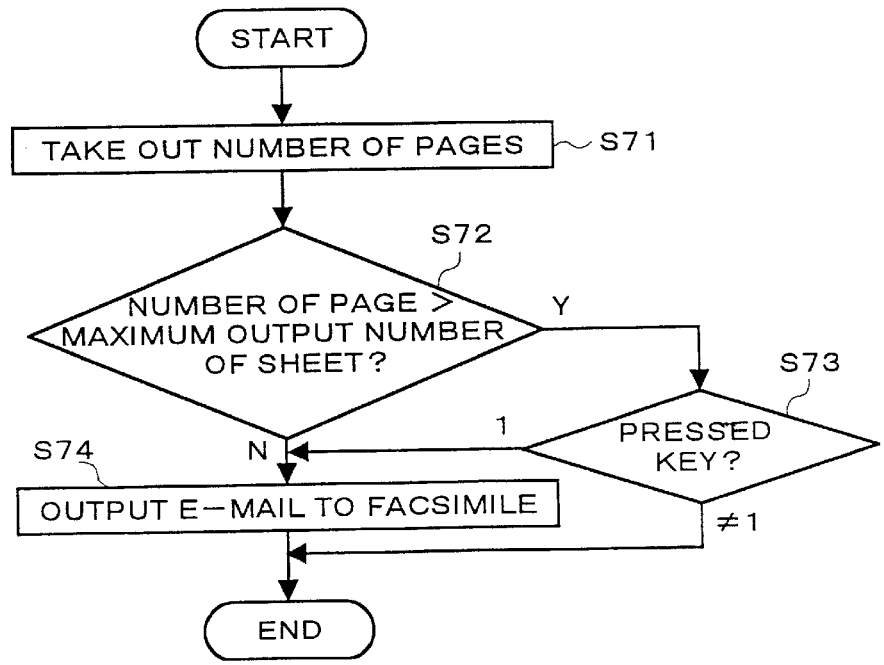
FIG. 14 is a flowchart when output exceeding a prescribed number of sheets is controlled.

Now, a case is described where an e-mail is output at or less than the maximum output number of sheets of the facsimile by referring to the flowchart of FIG. 14 and FIG. 7.

When the converting apparatus receives at the LAN controlling section 7 an e-mail containing data at the maximum output number of sheets, for example, when it recognizes that the header information (From) of the e-mail is master, and the Subject is !!$pmax, the text of the e-mail is stored in the RAM 3 and the HD 9 as the maximum output number of sheets. It is determined from the maximum output number of sheets and the number of sheets of the e-mail whether or not the e-mail is output to the facsimile.

First, when the LAN controlling section 7 receives an e-mail while the HD 9 contains data at the maximum output number of sheets, it takes out the number of sheets of the e-mail (S 71), and compares the content of the tag of the text of the e-mail in the TIFF structure (Page Number) with the maximum output number of sheets. If the content of the tag (Page Number) is larger than the maximum output number of sheets, it waits for pressing of the ten-key 13 (S 73). When key 1 is pressed, it means that the number of sheets of the e-mail exceeds the maximum output number of sheets of the facsimile. Then, the e-mail format reverse converting section 11 converts the text of the e-mail into facsimile data, and transmits the facsimile data to a telephone number corresponding to the e-mail address according to the correspondence table stored in the HD 9 (S 74). In this case, the switch 4 appropriately changes over the switching portion 5 depending on the destination telephone number to select the telephone line L1 or L2. If a key other than key 1 is pressed, the e-mail is not converted into the facsimile data, and transmitted to the facsimile.

On the other hand, if the content of the tag (Page Number) is smaller than the maximum output number of sheets, the e-mail format reverse converting section 11 converts the text of the e-mail into facsimile data, and transmits the facsimile data to a telephone number corresponding to the e-mail address according to the correspondence table stored in the HD 9 (S 74).

According to such arrangement, it is possible to save number of print paper in the LAN attached facsimile where the paper cost is higher than the communication cost.

Figures 15, 16:
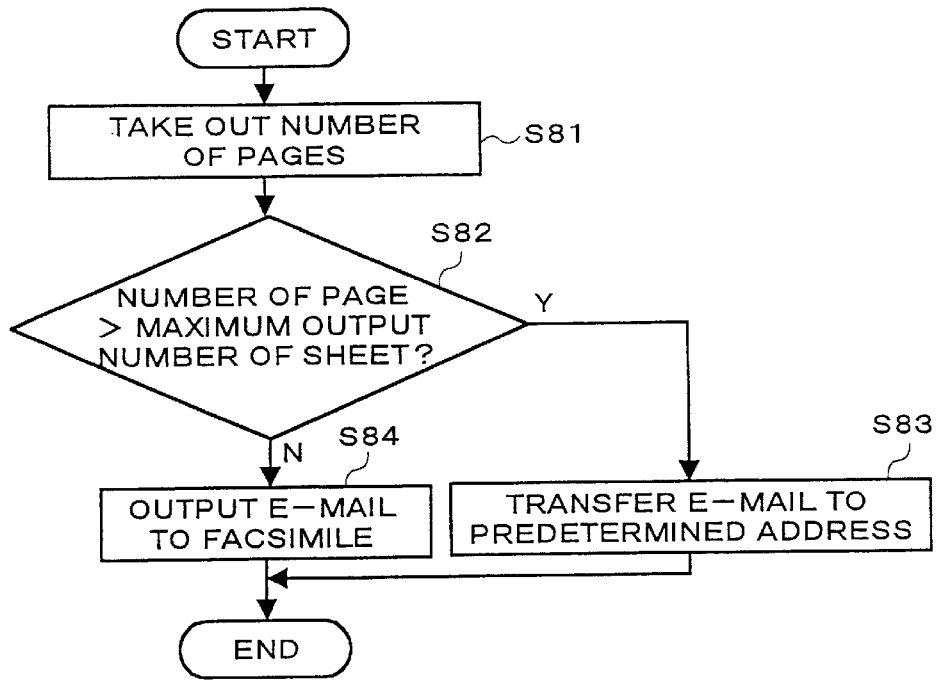
FIG. 15 is a flowchart when output exceeding a prescribed number of sheets is transferred to another line.
FIG. 16 is a table showing correspondence between e-mail addresses of a transmitting party and encryption keys.

Now, a case is described where, when the number of sheets of an e-mail exceeds the maximum output number of sheets, the e-mail is transferred to another e-mail address by referring to the flowchart of FIG. 15 and FIG. 7.

When the LAN controlling section 7 receives an e-mail containing an e-mail address for transfer, for example, when it recognizes that the header information (From) of the e-mail is master, and its Subject is !!$trn, the text of the e-mail or the e-mail address for transfer is stored in the RAM 3 and the HD 9 as the e-mail address for transfer. When the number of sheets of the e-mail exceeds the maximum output number of sheets of the facsimile, the e-mail is transferred to the e-mail address for transfer.

When the LAN controlling section 7 receives an e-mail, it takes out the content of the tag of the text of the e-mail in the TIFF structure (Page Number) (S 81), and determines from the content of the tag and the maximum output number of sheets stored in the HD9 as described above whether or not the e-mail is transferred to the e-mail address for transfer (S 82). When the content of the tag (Page Number) is larger than the maximum output number of sheets, the LAN controlling section 7 transfers the text of the e-mail to the e-mail address for transfer (S 83).

On the other hand, when the content of the tag (Page Number) is smaller than the maximum output number of sheets, the e-mail format reverse converting section 11 converts the text of the e-mail into facsimile data, and transmits the facsimile data to a telephone number corresponding to the e-mail address according to the correspondence table stored in the HD 9 (S 84).

In this arrangement, it is possible to transmit the e-mail to a predetermined e-mail address for transfer even if the content of the tag does not exceed the maximum output number of sheets. This enables it to previously view the content of received documents in mass on a display of a PC, so that the number of sheets of paper can be saved.

Now, description is given on a case where facsimile data is transmitted as an e-mail, and where data of an e-mail is transmitted to a facsimile apparatus by referring to FIGS. 16 through 19 and FIG. 7.

When the converting apparatus receives in the LAN controlling section 7 an e-mail containing an encryption key table for it and an encryption key table for the other party, for example, when it recognizes that the header information (From) of the e-mail is master, and its Subject is !!$myciph, the text of the e-mail is defined as the encryption key table for it shown in FIG. 16. Further, for example, when it recognizes that the header information (From) of the e-mail is master, and its Subject is !!yourciph, the text of the e-mail or the encryption key table for the other party is stored in the RAM 3 and the HD 9, and is defined as the encryption key table for the other party shown in FIG. 17.

Figures 17, 18:
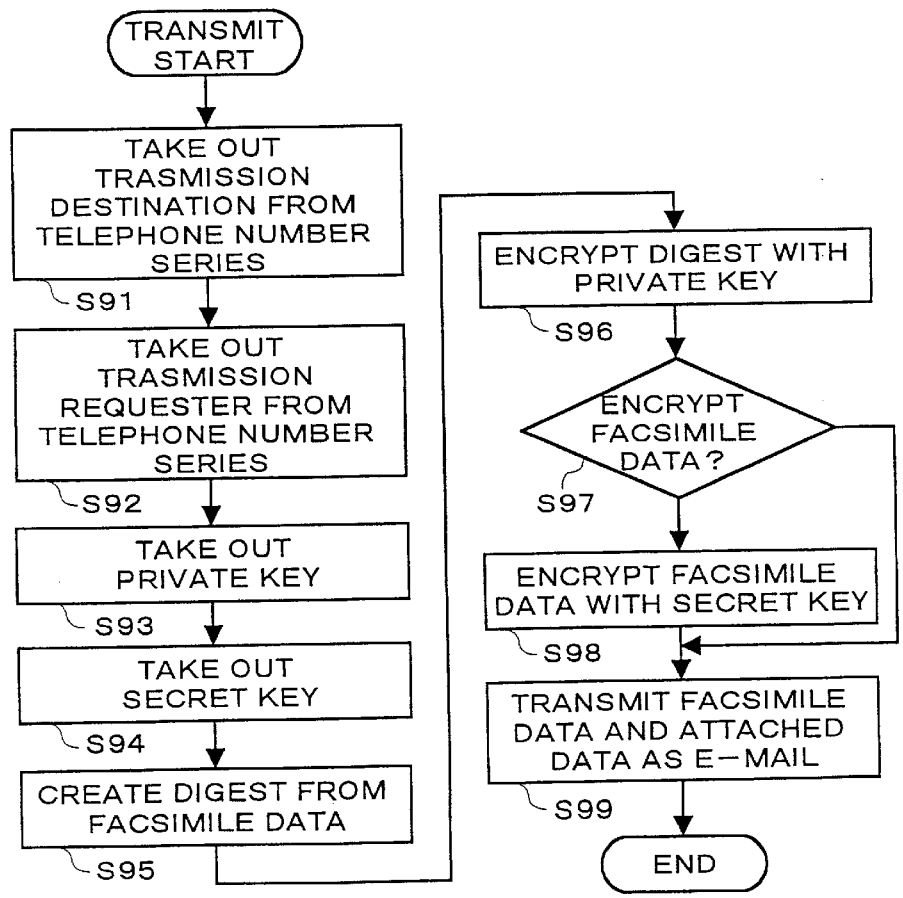
FIG. 17 is a table showing correspondence between e-mail addresses of a receiving party and encryption keys.
FIG. 18 is a flowchart when an encryption e-mail is transmitted.

FIG. 18 is a flowchart when an encrypted e-mail is transmitted. First, when the operator places a transmit document on a predetermined position of the facsimile apparatus 6, and enters an telephone number through the operation panel of the facsimile apparatus 6, its data is received by the apparatus through the telephone line L1. If, for example, the telephone number transmitted over the telephone line L1 is #123*890, the destination 123 to which the e-mail is transmitted is taken out from telephone numbers stored in the HD 9 (S 91), and the transmission requester is identified from the telephone number (S 92).

Then, a private key corresponding to 890 in the public encryption key system is taken out from the own encryption key table stored in the HD 9 shown in FIG. 16 (S 93). Subsequently, a secret key corresponding to 123 in the secret key system is taken out from the encryption key table for the other party stored in the HD 9 shown in FIG. 17 (S 94).

Then, a so-called digest is created by digitizing the facsimile data transmitted following the sent telephone number under a predetermined rule (S 95). The digest is used for checking whether or not the content is tempered as it is received. The digest is then encrypted by the private key (S 96). Then, it is determined whether or not the facsimile data is encrypted (S 97).

If it is encrypted, the facsimile data is encrypted by the secret key that is taken out (S 98). The e-mail format converting section 8 converts the encrypted facsimile data into the e-mail format together with associated data, and the LAN controlling section 7 transmits the facsimile data converted into the e-mail format to the destination corresponding to the secret key as an e-mail (S 99). On the other hand, if the facsimile data is not encrypted, the e-mail format converting section 8 converts the facsimile data into the e-mail format together with associated data, and the LAN controlling section 7 transmits the facsimile data converted into the e-mail format to the destination corresponding to the secret key (S 99).

Figure 19:
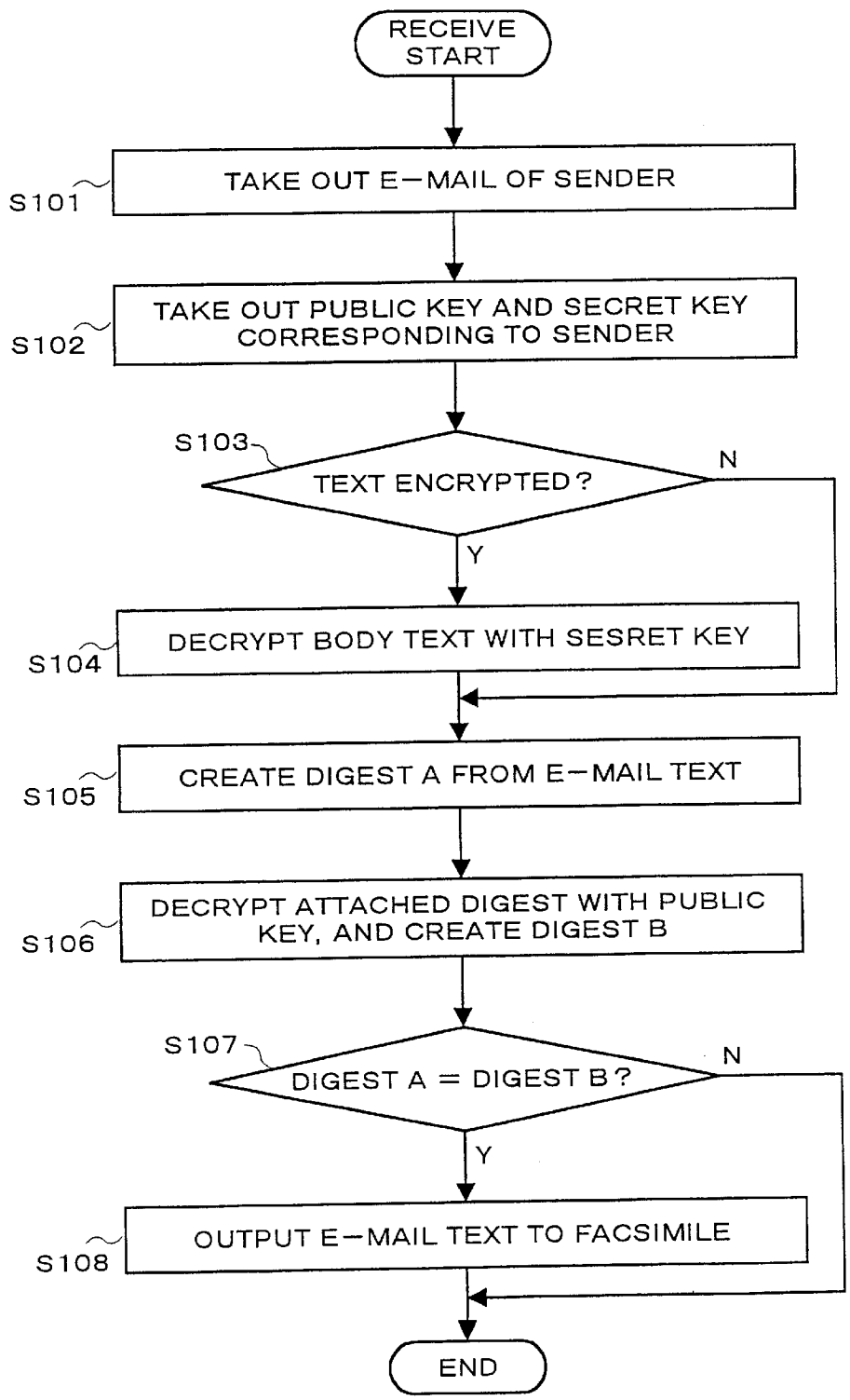
FIG. 19 is a flowchart when an encryption e-mail is received.

FIG. 19 is a flowchart when an encrypted e-mail is received. First, when the operator receives an e-mail, the data is entered into the LAN controlling section 7 of the converting apparatus. In this case, an e-mail address is taken out from the header information (From) of the e-mail (S 101), and a corresponding public key in the public key system and a secret key in the secret key system are taken out from the encryption key table for the other party (S 102).

Then, it is determined whether or not the text of the e-mail is encrypted (S 103). If it is encrypted, the text body is decrypted by the secret key (S 104).

Subsequently, a digest A is created by digitizing the facsimile data under a predetermined rule (S 105). In addition, a digest B is created by decrypting an attached digest with a public key (S 106). On the other hand, if the e-mail is not encrypted, a digest A is created by digitizing the text as it is under the predetermined rule (S 105), and a digest B is created by decrypting an attached digest with a public key (S 106).

Then, it is determined whether or not the digests A and B match by comparing them (S 107). If both digests match, the e-mail format reverse converting section 11 converts the text of the e-mail into facsimile data, and outputs the converted facsimile data to the facsimile (S 108).

In the above, the private key, the secret key, and the public key shown in FIGS. 16 and 17 correspond to specific telephone numbers and e-mail addresses, respectively. In addition, although, in the above, integrity is checked for the contents of the facsimile data before encryption and the data of the decrypted e-mail, it may be checked for the contents of encrypted data and data before decryption.

According to the above arrangement, it is possible to perform operation only to output a document assured for safety even in a network environment where security is critical.

Although the above embodiment is described for a case where one LAN and two telephone lines L1, L2 are attached to the converting apparatus, the present invention is not limited to such arrangement. It may be applied to an environment having two or more LANs and one or more than two telephone lines attached if it is allowed to transmit and receive data in a predetermined format to and from a specified destination through data conversion between a network transmitting and receiving data based on an e-mail address, and a network transmitting and receiving data based on a telephone number.

As described above, the electronic mail converting apparatus for facsimile according to the present invention can change over between a telephone line and a LAN therein under an instruction, convert data from facsimile data to e-mail data or vice versa, as required, with converting section means, and transmit the converted data to a specified destination. Therefore, it is possible to change over transmission of a facsimile document between facsimile transmission and e-mail transmission by using an existing facsimile, without a specific interface.

INDUSTRIAL APPLICABILITY

The electronic mail converting apparatus for facsimile according to the present invention is suitable in transmission and reception of facsimile data and/or e-mail data between a public network or a facsimile and a LAN by using an existing facsimile apparatus.

What is claimed is:

1. An electronic mail converting apparatus for a facsimile, the apparatus comprising:

a receiving device that receives data transmitted by one of a facsimile, a public network, and a LAN;

a recognizing device that recognizes the data received by the receiving device;

a converting device that converts the data into a predetermined format; and a transmitting device that transfers the data to any one of the facsimile, the public network, and the LAN, wherein when the data is electronic mail data received through the LAN, if the number of sheets of the electronic mail is equal to or less than a predetermined maximum output number of sheets, the electronic mail is transferred to the facsimile, and if the number of sheets of the electronic mail is larger than the maximum output number of sheets, transmission of the electronic mail data is temporarily suspended until an operator inputs a predetermined instruction, wherein the number of sheets of the electronic mail is read from the electronic mail data.

2. The apparatus according to claim 1, wherein the number of sheets of the electronic mail is read from a content of a tag in TIFF in the electronic mail data.

3. The apparatus according to claim 1, wherein the maximum output number of sheets is stored in a storage device.

4. The apparatus according to claim 1, wherein if the number of sheets of the electronic mail data is larger than the maximum output number of sheets, the transmission of the electronic mail data is temporally suspended until a predetermined key is pressed by the operator.

5. The apparatus according to claim 4, wherein the transmission of the electronic mail data is canceled when a key other than the predetermined key is pressed by the operator.

6. The apparatus according to claim 1, wherein the apparatus is connected to the facsimile through a locally attached telephone line.

7. An electronic mail converting apparatus for facsimile, the apparatus comprising:

a receiving device that receives data transmitted by one of a facsimile, a public network, and a LAN;

a recognizing device that recognizes the data received by the receiving device;

a converting device that converts the data into a predetermined format; and a transferring device that transfers the data to any one of the facsimile, the public network, and the LAN, wherein, when the data is electronic mail data received through the LAN, if the number of sheets of the electronic mail is equal to or less than a predetermined output number of sheets, the electronic mail data is transferred to the facsimile, and if the number of sheets of the electronic mail is larger than the predetermined output number, the electronic mail data is transferred to a predetermined electronic mail address through the LAN without being transferred to the facsimile.

8. The apparatus according to claim 7, wherein the number of sheets of the electronic mail is read from the electronic mail data.

9. The apparatus according to claim 8, wherein the number of sheets of the electronic mail is read from a content of a tag in TIFF in the electronic mail data.

10. The apparatus according to claim 7, wherein the maximum output number of sheets is stored in a storage device.

11. The apparatus according to claim 7, wherein the predetermined electronic mail address is stored in a storage device.

12. The apparatus according to claim 7, wherein the apparatus is connected to the facsimile through a locally attached telephone line.

13. The apparatus according to claim 7, wherein the predetermined electronic mail address is that of a personal computer having a display.

14. A method for converting an electronic mail to facsimile data, the method comprising:

receiving data transmitted by one of a facsimile, a public network, and a LAN;

recognizing whether the received data is an electronic mail data through the LAN;

reading the number of sheets of the electronic mail from the electronic mail data:

comparing a number of sheets of the recognized electronic mail data with a predetermined maximum output number of sheets;

converting the electronic mail data into a predetermined format and transferring the converted data to the facsimile when the number of sheets of the recognized electronic mail data is equal to or less than the predetermined maximum output number; and suspending transmission of the electronic mail data to the facsimile until an operator inputs a predetermined instruction when the number of sheets of the electronic mail data is larger than the maximum output number.

15. The method according to claim 14, wherein the number of sheets of the electronic mail data is read from TIFF of the electronic mail data.

16. The method according to claim 14, wherein the maximum output number of sheets is stored in a storage device.

17. The method according to claim 14, wherein the transmission of the electronic mail data is suspended until the operator presses a predetermined key.

18. The method according to claim 17, wherein the transmission of the electronic mail data is canceled when a key other than the predetermined key is pressed by the operator.

19. The method according to claim 14, wherein the converted data is transferred to the facsimile by connection to a locally attached telephone line.

20. A method for converting an electronic mail to facsimile data, the method comprising:

receiving data transmitted by one of a facsimile, a public network and a LAN;

recognizing whether the received data is an electronic mail data through the LAN;

comparing a number of sheets of the recognized electronic mail data with a predetermined maximum output number of sheets;

converting the electronic mail data into a predetermined format and transferring the converted data to the facsimile when the number of sheet of the recognized electronic mail data is equal to or less than the predetermined maximum output number; and transferring the electronic mail data to a predetermined mail address through the LAN without being transferred to the facsimile when the number of sheets of the electronic mail data is larger than the maximum output number.

21. The method according to claim 20 further comprising:

reading the number of sheets of the electronic mail data from the electronic mail data.

22. The method according to claim 21, wherein the number of sheets of the electronic mail data is read from TIFF of the electronic mail data.

23. The method according to claim 20, wherein the maximum output number of sheets is stored in a storage device.

24. The method according to claim 20, wherein the predetermined electronic mail address is stored in a storage device.

25. The method according to claim 20, wherein the converted data is transferred to the facsimile by connection to a locally attached telephone line.

26. The method according to claim 20, wherein the predetermined electronic mail address is that of a personal computer having a display.

* * * * *